UNITED STATES PATENT OFFICE.

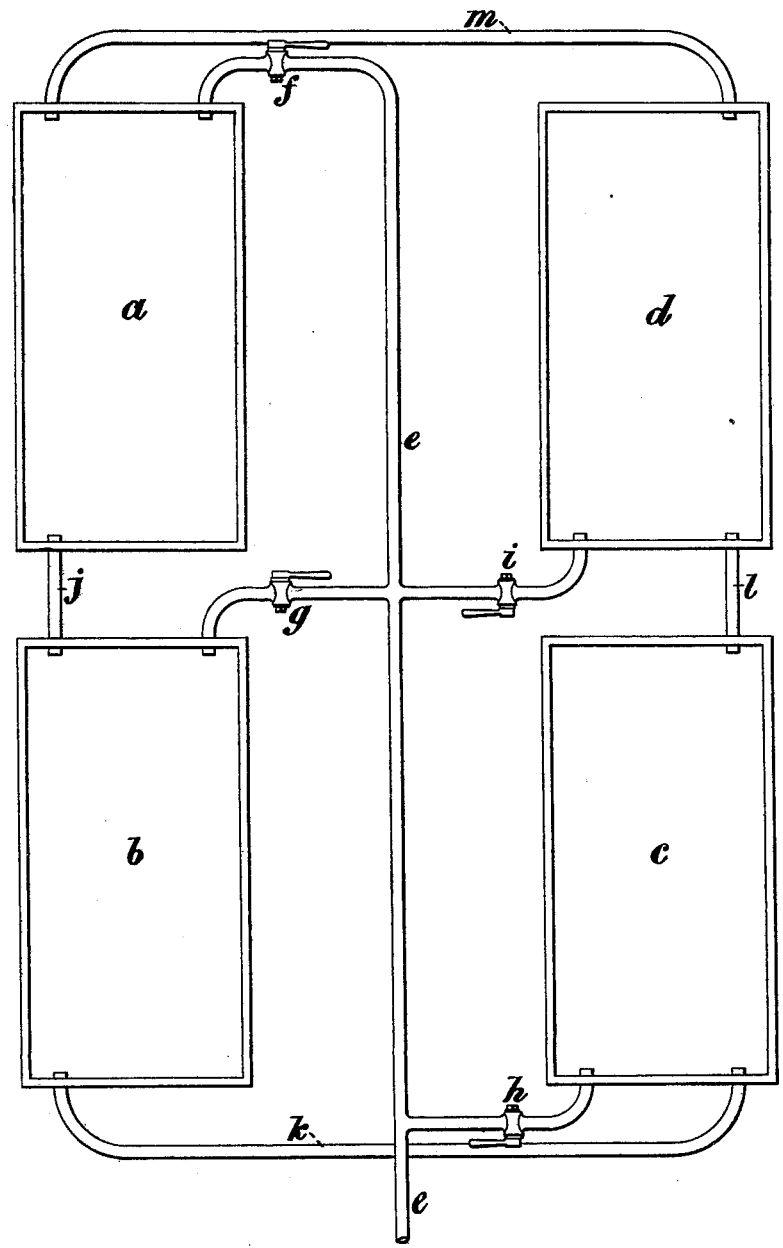

JOSHUA SIDDELEY AND FREDERICK N. MACKAY, OF LIVERPOOL, ENGLAND.

IMPROVEMENT IN PROCESSES AND APPARATUS FOR MAKING ICE.

Specification forming part of Letters Patent No. 206,626, dated July 30, 1878; application filed May 20, 1878; patented in England, May 10, 1875.

*To all whom it may concern:*

Be it known that we, JOSHUA SIDDELEY and FREDERICK NOEL MACKAY, both of Liverpool, in the county of Lancaster, England, have invented a new and useful Process for Making Clear Block-Ice, for which English Patent No. 1,726 of 1875 was granted to us, and which process is fully set forth in the following specification.

This invention relates to the process for manufacturing clear block-ice, in which a series of tanks contain cells, or their equivalents, through which brine or other cooling or refrigerating fluid circulates.

It has been found in practice that, when the ice formed on the sides of the cells in a tank has become of such a thickness that nearly all the water in the tank is frozen, the uncongealed water which remains between the slabs of ice contains dissolved therein a large amount of air, and that when the freezing is continued until the adjacent slabs of ice unite the central portion of the block so formed is opaque and full of air-bubbles.

Now our process consists in causing the nearly-congealed water in a tank in which the freezing process is almost completed to pass into a second tank where the freezing process is not so far advanced, so that the highly-aerated water may be distributed among a larger body of water which does not contain so much air, and in replacing the highly aerated water removed by fresh water which has not been subjected to the freezing process, and consequently contains but little air.

The operation of changing the water is carried on in a series of tanks, commencing with the tank in which the freezing process is nearest finished and ending with the tank in which the process of freezing is only just commencing. Each tank becomes, in this way, the first, intermediate, and last of a series.

Many arrangements of tanks and communications may be employed in carrying our invention into practice; but the accompanying drawing illustrates the arrangement which we prefer when four tanks are used.

In the four tanks $a\ b\ c\ d$ are placed or fixed cells of any desired construction, through which brine or other fluid at a temperature below freezing is caused to circulate.

$e$ is a pipe, by which the water is supplied to the tanks through the cocks $f\ g\ h\ i$. $j\ k\ l\ m$ are pipes opening each from one tank to another.

The action is as follows: Suppose that the tanks $a\ b\ c$ are filled with water and the process of congelation is proceeding. The ice on the sides of the cells in $a$ will be thicker than in $b$, and that in $b$ will be thicker than that in $c$, in consequence of the brine or other refrigerating-fluid passing through the cells in $a$ to those in $b$, and finally passing away from those in $c$ to the refrigerator, where it is again cooled. When nearly the whole of the water in $a$ has been frozen the cock $f$ is opened, and sufficient fresh water is allowed to enter the tank $a$ to displace and drive out the highly-aerated water therein into $b$, whereby some of the water in $b$ is caused to pass into $c$, from which some of the water overflows into $d$. As soon as the water in $a$ is frozen solid between the cells the passage of the brine through the cells in $a$ is stopped, and the tank $b$ becomes the first of the series, and the tank $d$, through the cells in which the brine is now allowed to pass, is filled with water and becomes the last. The ice formed is now removed from $a$, which in its turn will become the last of the series.

In this way none of the cold water to be frozen is wasted, but passes from one tank to another as it becomes too highly aerated to freeze into clear ice.

If desired, a small stream of water might be kept constantly flowing into the first tank of the series, the overflow running into the last or empty tank.

What we claim as our invention is—

1. The process herein described for making clear block-ice, which consists in replacing water which has become highly aerated by fresh water, and transferring the aerated water from tank to tank throughout the tanks of a progressive series, substantially as specified.

2. The combination, in an ice-machine, of a series of tanks and their connections, for establishing communication between the tanks, the whole arranged substantially as herein specified, so that the water to be frozen may pass from one tank to another throughout the series, substantially as and for the purpose specified.

JOSHUA SIDDELEY.
FREDK. N. MACKAY.

Witnesses:
 D. KING,
 J. JOHNSON.